(12) United States Patent
Amura et al.

(10) Patent No.: US 10,160,287 B2
(45) Date of Patent: Dec. 25, 2018

(54) AGRICULTURAL VEHICLE CAB FITTED WITH AN HVAC SYSTEM

(75) Inventors: Mario Amura, Modena (IT); Pierre Bugeja, Nonantola (IT); Alessio Cadalora, Modena (IT); Tiziano Salvini, Tribiano (IT); Lorena Stanzani, Castelfranco Emilia (IT)

(73) Assignee: CNH Industrial America LLC, New Holland, PA (US)

( * ) Notice: Subject to any disclaimer, the term of this patent is extended or adjusted under 35 U.S.C. 154(b) by 701 days.

(21) Appl. No.: 13/805,364

(22) PCT Filed: Jun. 30, 2011

(86) PCT No.: PCT/EP2011/060997
§ 371 (c)(1),
(2), (4) Date: Mar. 28, 2013

(87) PCT Pub. No.: WO2012/001095
PCT Pub. Date: Jan. 5, 2012

(65) Prior Publication Data
US 2013/0203333 A1    Aug. 8, 2013

(30) Foreign Application Priority Data
Jul. 2, 2010  (IT) ............................... TO2010A0569

(51) Int. Cl.
*B60H 1/00*  (2006.01)
*B60H 1/24*  (2006.01)
(Continued)

(52) U.S. Cl.
CPC ......... *B60H 1/00378* (2013.01); *B60H 1/242* (2013.01); *B60H 1/262* (2013.01); *B60H 3/0608* (2013.01); *B60H 2001/00242* (2013.01)

(58) Field of Classification Search
CPC ..... B60H 1/00378; B60H 1/242; B60H 1/262
(Continued)

(56) References Cited

U.S. PATENT DOCUMENTS 4,022,599 A * 5/1977 Wilson ............... B60H 1/00042
454/156
4,300,720 A * 11/1981 Baier ................. B60H 1/00378
454/93
(Continued)

FOREIGN PATENT DOCUMENTS

CN          200996157 Y  * 12/2007
DE      102008042856 A1 *  4/2010 ............. B60H 1/008
(Continued)

OTHER PUBLICATIONS

Tuesday et al, CN 200996157 Y English machine translation, Dec. 27, 2007.*

*Primary Examiner* — Kenneth Rinehart
*Assistant Examiner* — Phillip E Decker
(74) *Attorney, Agent, or Firm* — Rickard K. DeMille; Rebecca L. Henkel

(57) ABSTRACT

A cab of an agricultural vehicle has having a seat for an operator and a console unit arranged forward of the seat for housing an instrument display. The cab is fitted with an HVAC system comprising a heat exchanger unit located within the console unit and a blower located on the floor of the cab beneath or adjacent the seat and serving to blow air by way of a floor-level duct to the heat exchanger unit.

9 Claims, 3 Drawing Sheets

(51) Int. Cl.
  *B60H 1/26* (2006.01)
  *B60H 3/06* (2006.01)
(58) Field of Classification Search
  USPC ........................................................ 454/137
  See application file for complete search history.

(56) References Cited

U.S. PATENT DOCUMENTS

| | | | | |
|---|---|---|---|---|
| 4,344,356 | A * | 8/1982 | Casterton | B60H 1/00378 454/139 |
| 4,467,706 | A * | 8/1984 | Batcheller | B60H 1/00378 454/70 |
| 4,531,453 | A * | 7/1985 | Warman | B60H 1/00378 454/139 |
| 4,612,975 | A * | 9/1986 | Ikari | B60H 1/00378 454/161 |
| 4,669,564 | A * | 6/1987 | Kreutz | B60H 1/00378 180/89.12 |
| 4,711,159 | A * | 12/1987 | Armbruster | B60H 3/0616 454/137 |
| 5,119,718 | A * | 6/1992 | Wagner | B60H 1/00378 454/136 |
| 6,101,828 | A * | 8/2000 | Shikata | B60H 1/00028 165/42 |
| 6,282,911 | B1 * | 9/2001 | Watanabe | B60H 1/00207 454/129 |
| 6,398,294 | B1 * | 6/2002 | Bollweg | B60H 1/00378 296/190.09 |
| 6,409,254 | B2 * | 6/2002 | Tiziano | B62D 33/06 296/190.03 |
| 6,457,767 | B1 * | 10/2002 | Omarain | B60H 1/247 296/208 |
| 6,715,540 | B2 * | 4/2004 | Kobayashi | B60H 1/3207 237/2 A |
| 6,938,677 | B2 * | 9/2005 | Yamakawa | B60H 1/00207 237/12.3 A |
| 7,290,829 | B2 * | 11/2007 | Umemoto | B62D 33/0617 296/190.05 |
| 7,377,848 | B2 * | 5/2008 | Voit, II | B60H 1/00378 454/137 |
| 8,128,161 | B2 * | 3/2012 | Yang | B60H 1/00564 296/208 |
| 9,643,662 | B2 * | 5/2017 | Nagami | B62D 33/0617 |
| 2006/0046634 | A1 * | 3/2006 | Stough | B60H 1/00378 454/158 |
| 2006/0118290 | A1 * | 6/2006 | Klassen | B60H 1/00378 165/202 |
| 2008/0066480 | A1 * | 3/2008 | Kamiyama | B60H 1/242 62/244 |
| 2008/0245501 | A1 * | 10/2008 | Kang | B60H 1/00564 454/284 |
| 2011/0241379 | A1 * | 10/2011 | Obe | B60H 1/00378 296/190.09 |
| 2011/0252756 | A1 * | 10/2011 | Geiss | B60H 1/00378 55/478 |
| 2012/0003911 | A1 * | 1/2012 | Geiss | B60H 1/00378 454/143 |
| 2014/0209269 | A1 * | 7/2014 | Goenka | B60H 1/00207 165/42 |

FOREIGN PATENT DOCUMENTS

| | | | | |
|---|---|---|---|---|
| EP | 0773124 A1 * | 5/1997 | ......... | B60H 1/00378 |
| EP | 1457364 A1 * | 9/2004 | ......... | B60H 1/00378 |
| GB | 2417440 A * | 3/2006 | | |
| JP | 07205639 A * | 8/1995 | | |
| JP | 11291750 A * | 10/1999 | | |
| WO | WO 2010066877 A1 * | 6/2010 | ......... | B60H 1/00378 |

* cited by examiner

AGRICULTURAL VEHICLE CAB FITTED WITH AN HVAC SYSTEM

CROSS REFERENCE TO RELATED APPLICATIONS

This application is the US National Stage filing of International Application Ser. No. PCT/EP2011/060997, entitled "AGRICULTURAL VEHICLE CAB FITTED WITH AN HVAC SYSTEM," filed on Jun. 30, 2011, which claims priority to Italian Application Serial No. TO2010A000569, filed Jul. 2, 2010, each of which is incorporated herein by reference in its entirety for all purposes.

FIELD OF THE INVENTION

The present invention relates to a heating, ventilation and air conditioning (HVAC) system fitted to the cab of an off-highway vehicle, this term being used to include agricultural vehicles such as tractors and harvesters and construction machine such as excavators and telehandlers.

BACKGROUND OF THE INVENTION

As is known, the essential components of a vehicle HVAC system include an air inlet, a filter for removing dust and dirt particles from the intake air, a blower, a heat exchanger unit which may include at least one of an evaporator through which flows the refrigerant of a refrigeration circuit and a radiator through which flows a heated liquid (usually that circulating in the engine cooling system), and air vents for discharging air into the cab after it has been filtered and blown through the heat exchanger unit by the blower.

The design and location of the HVAC system of an off-highway vehicle, requires careful consideration on account of the limited space available within the cab. Because off-highway vehicles often operate in a dirty environment, it is preferable for the air intake to be located at rooftop level and a compact configuration that is sometimes adopted is to place all the components of the HVAC system in a roof mounted unit. However, this is sometimes not possible, for example if the cab has an opening roof or if the HVAC unit would restrict visibility unacceptably.

An alternative solution that has been proposed is to place the blower and the heat exchanger unit beneath the seat of the operator but that too is not always practicable.

In particular, in some vehicles the clearance between the seat and the floor of the cab is not large enough to accommodate the heat exchanger unit and the blower. Furthermore, in such a configuration the air in the duct may be heated while flowing from the heat exchanger unit to vents in the console unit or dashboard.

Another solution would be to have the HVAC located partly within the cabin and partly in the engine bay but this would expose the components of the HVAC system to a dirt environment and to higher temperatures and would take up valuable packaging space within the engine bay.

OBJECT OF THE INVENTION

The present invention seeks therefore to provide an HVAC system for the cab of an off-highway vehicle that mitigates at least some of the foregoing disadvantages and enables the system to be integrated into cab in a space efficient manner without obstructing visibility and without taking up excessive space within the cab.

SUMMARY OF THE INVENTION

In accordance with a first aspect of the present invention, there is provided a cab of an off-highway vehicle having a seat for an operator and a console unit arranged forward of the seat for housing an instrument display, wherein the cab is fitted with an HVAC system comprising a heat exchanger unit located within the console unit and a blower located on the floor of the cab beneath or adjacent the seat and serving to blow air by way of a floor-level duct to the heat exchanger unit.

Discharge vents may suitably be mounted in the console unit to direct the air passing through the heat exchanger unit towards the operator.

Preferably, the air supply to the blower passes through a filter unit located within a wheel fender of the vehicle.

Advantageously, both plenum boxes of the filter unit, namely the dirty box upstream of the filter element and the clean box downstream of the filter element, are housed within the wheel fender. The air from the clean box may suitably be guided to the blower by way of a duct disposed within the cab and following the contour of the wheel fender.

The air intake of the HVAC system is preferably located on the outside of the cab at roof level and flows to the intake filter by way of a vertical duct, the latter being conveniently constituted by the B-pillar of the cab.

In a preferred embodiment of the invention, a second filter is provided, to allow the blower to draw filtered air from the interior of the cab for recirculation through the heat exchanger unit, in addition to or in place of the air drawn through the first filter.

In a second aspect of the invention, there is a provided an HVAC system for an off-highway vehicle having a blower for blowing air through a heat exchanger unit and a filter unit arranged upstream of the blower to filter the air blown by the blower, the filter unit comprising a dirty box and a clean box separated from one another by a filter element, characterised in that the entire filter unit is housed within a wheel fender of the vehicle.

Advantageously, the wheel fender include a removable panel that serves as a wall of the filter unit and, when removed, allows access to the interior of the filter unit for replacement of the filter element.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 3:
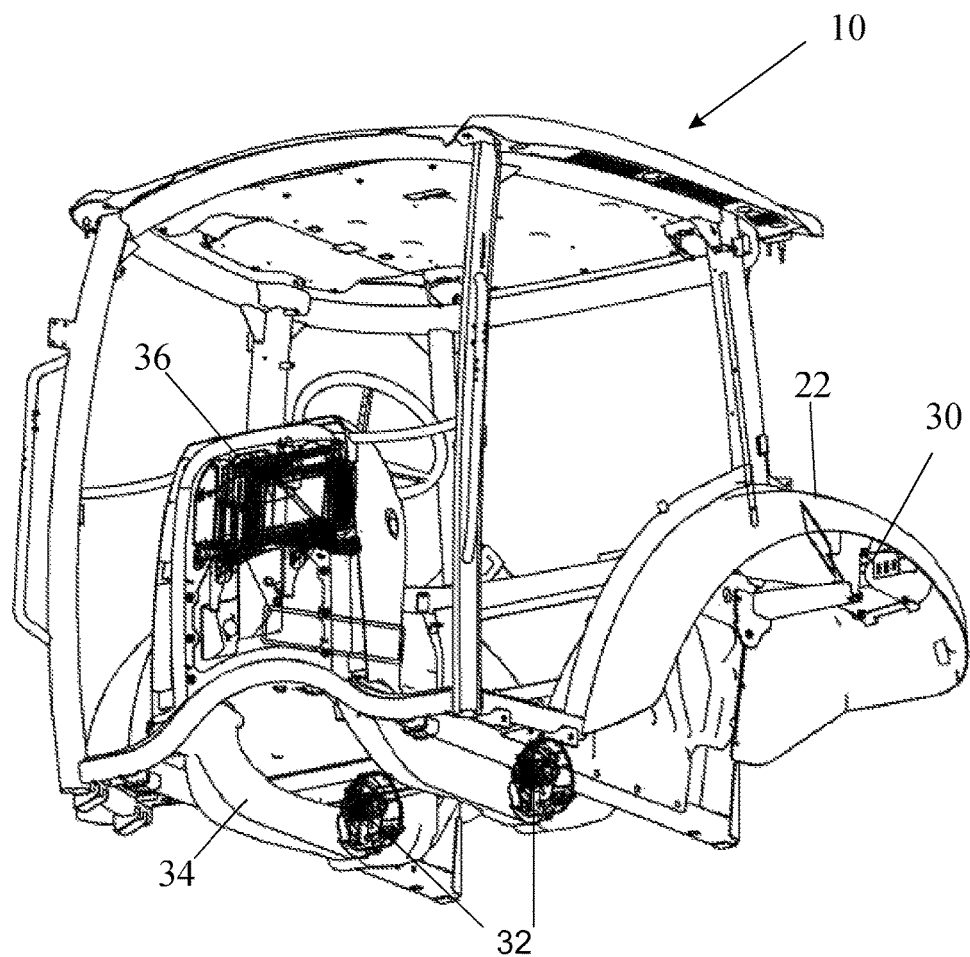
FIG. 3 is a rear perspective view of the cab in FIG. 2.
Figure 4:
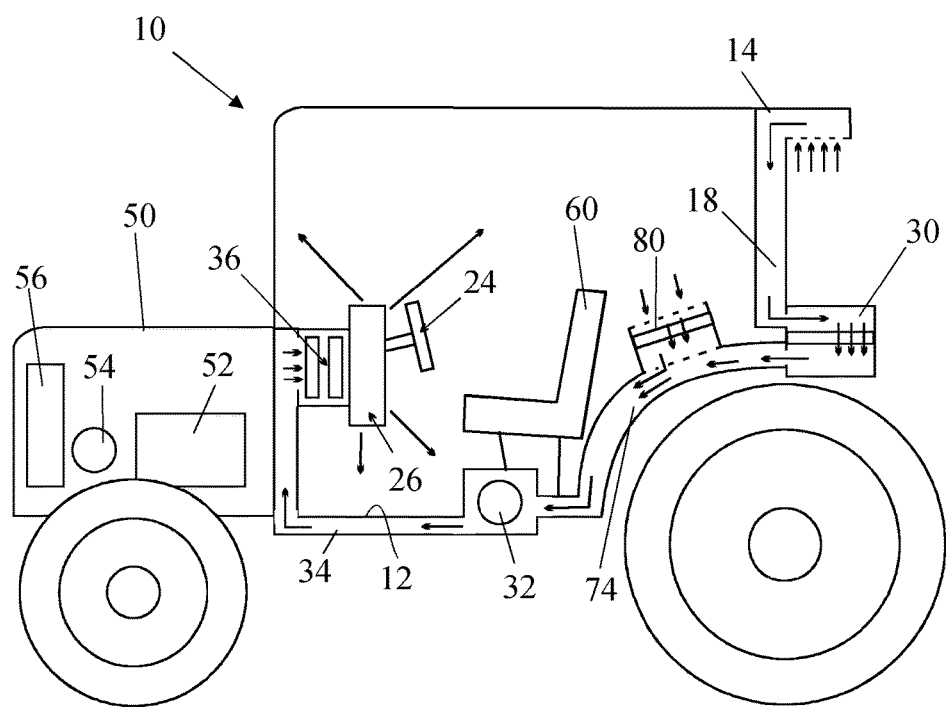
FIG. 4 is a schematic representation of the cab shown in FIGS. 2 and 3, and FIGS. 5 and 6 are sectional plan and side views, respectively, of a filter unit mounted within a wheel fender.

The cab 10 shown in FIGS. 1 to 4 has a floor 12, a roof 14 and A, B and C pillars supporting the roof 14, these being designated 16, 18 and 20, respectively. A wheel fender 22 is arranged on each side of the cab. The seat 60 for the driver, which is located centrally within the cab, has been omitted from FIGS. 1 to 3 but is shown in FIG. 4.

Forward of the seat 60, the cab contains a steering wheel 24 and a console unit 26. The console unit 26 houses the various instruments needed by the driver, such as the speedometer and various gauges, and it may also be used for mounting various switches and control knobs that are needed by the driver. It will be appreciated that this design of cab is entirely conventional and the invention is not concerned with the design of the cab itself but with the manner in which an HVAC system may be built into the cab.

Figure 1:
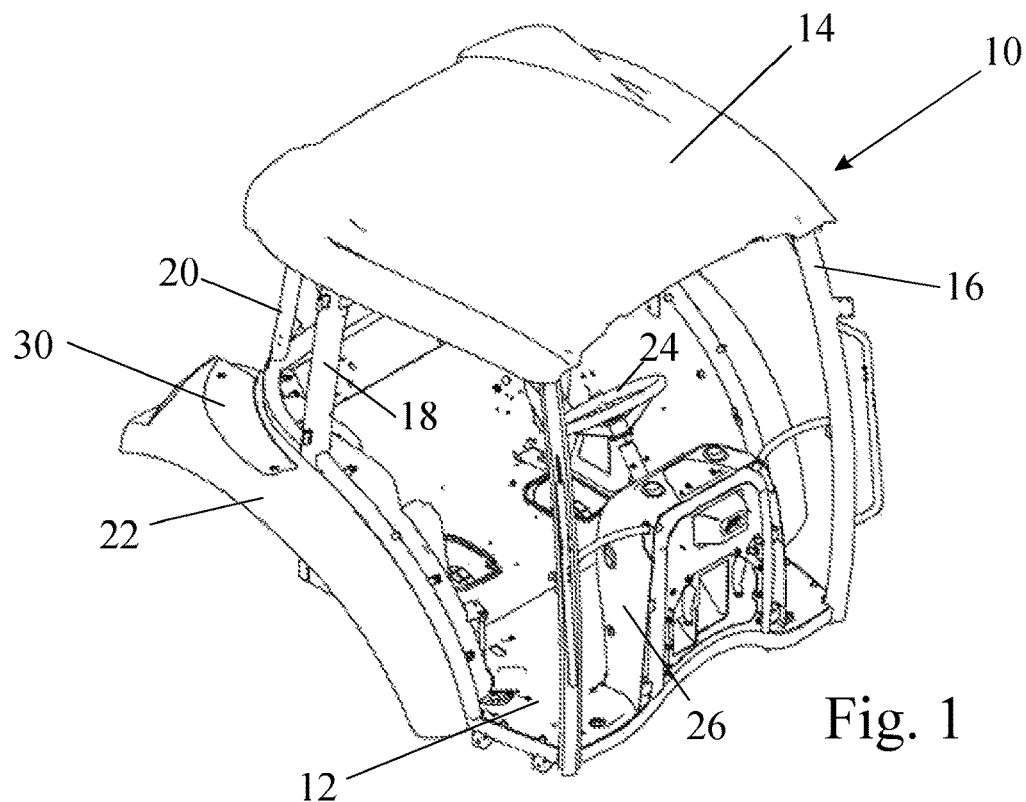
FIG. 1 is a front perspective view of the cab of a tractor.
Figure 2:
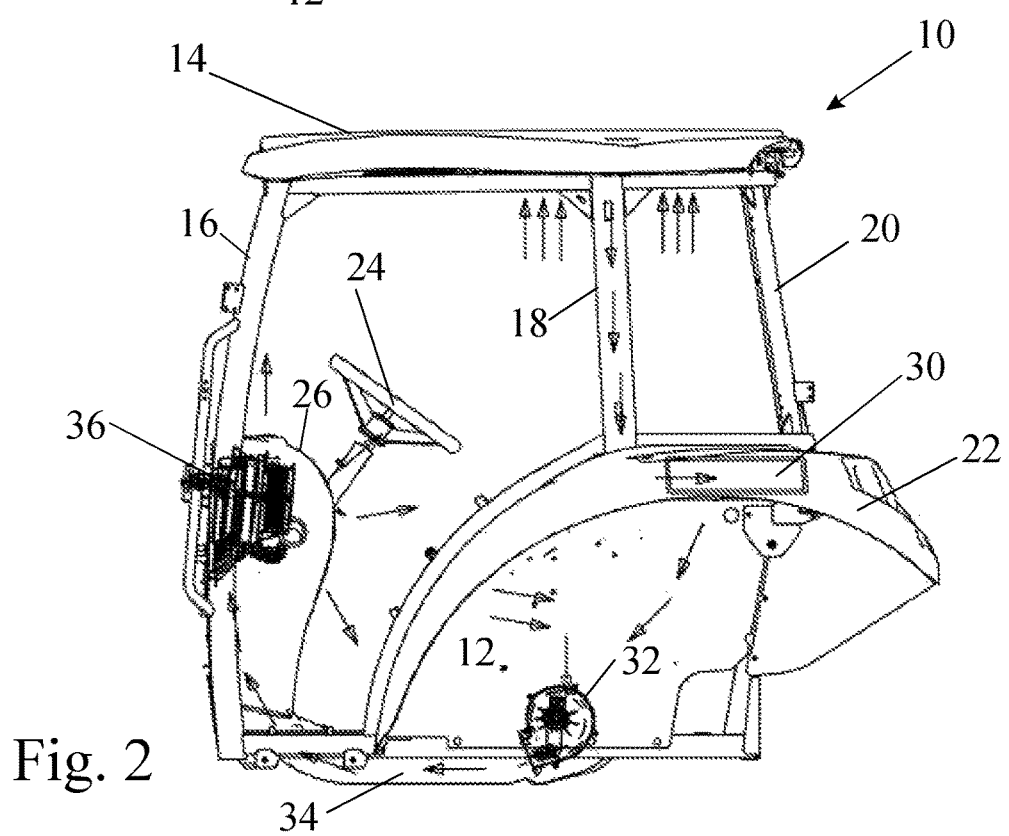
FIG. 2 is a side view of the cab shown in FIG. 1 indicating the location of the components of the HVAC system.

The doors of the cab are mounted between the A and B pillars 16, 18 and as can be seen from FIG. 1 the roof 14 overhangs the door openings. The air for the HVAC system in the preferred embodiment of the invention is drawn in through grills located on the underside of the overhanging portions of the roof 14, as shown schematically in FIG. 4 where the air flow is represented by arrows. As the air enters the HVAC system at roof level, it contains less dust than it would if the intake grills were located closer to the ground.

Figure 5:
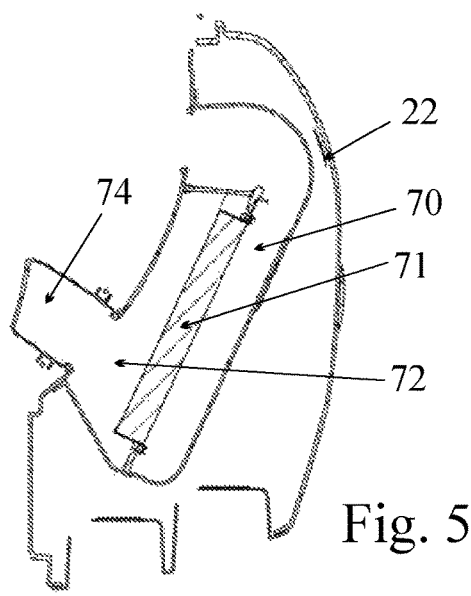
Figure 6:
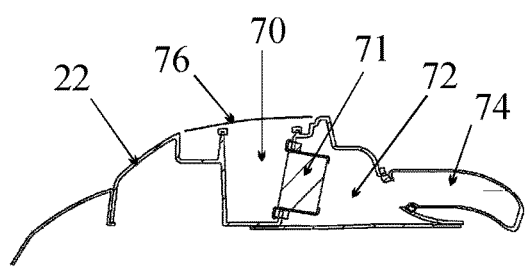

The intake air flows down the B pillar 18 to an air filter unit 30 located within the wheel fender 22. As shown in FIGS. 5 and 6, the air filter unit 30 comprises two plenum chambers 70 and 72 separated from one another by a filter element 71, these being referred to commonly as the dirty box and the clean box, respectively. In the preferred embodiment of the invention, both boxes 70 and 72 as well as the filter element are housed within the wheel fender 22. The top of the wheel fender has a removable access cover 76, shown in FIG. 6, to allow replacement of the filter element 71. The dirty box 70 communicates directly with the interior of the B pillar 18 whereas the clean box communicates with a conduit 74 arranged within the cab and following the contour of the wheel fender 22.

A blower 32 is arranged on the floor 12 of the cab adjacent and to one side, or beneath, the seat of the driver. In the embodiment of the invention shown in FIG. 3, two such blower are provided and disposed one on each side of the driver seat 60. The intake of the or each blower 32 is connected to the conduit 74 connected to the clean box of the filter unit 30 and its outlet communicates with a second conduit 34 that is built into the floor 12 of the cab. The conduit 34 is arranged on the underside of the floor. If the conduit 34 needs to pass adjacent any hot elements, such as an exhaust system, then it can be thermally insulated.

As shown in FIG. 4, a second filter 80 can be provided to allow the blower 32 to draw filtered air from the interior of the cab for recirculation through the heat exchanger unit, in addition to or in place of the air drawn through the first filter 30. Air recirculation is better suited to extremes of hot and cold conditions because of the multiple passes of the same air through the heat exchanger unit, whereas fresh air is to be preferred under other conditions. A flap may be provided to allow the driver to vary the relative proportions of recirculated air and fresh air flowing through the HVAC system.

The heat exchanger unit 36 is mounted in the console unit 26 on the front of the cab. As the engine bay 50, which houses the engine 52 as well as the compressor 54 and the evaporator 56 of the HVAC system is also located at the front the vehicle, the lengths of the pipes which convey a refrigeration coolant or hot water from the engine cooling system to the radiators of the heat exchanger unit 36 are minimised. Conduits within the console unit 26 guide the air blown by the blower 32 past the heat exchanger unit 36 to be discharged into the cab by way of air vents formed in the console unit 26. As represented by the arrows in FIG. 4, the air vents may be located to blow air towards the windscreen for defrosting/demisting or towards the face or the feet of the seated operator.

As is shown in FIG. 3, the entire HVAC system may be symmetrical, using two air filters 30 as well as two blowers 32 arranged one on each side of the cab 10.

By separating the blower(s) from the heat exchanger unit, the invention allows the space behind the console unit 26 to be used to accommodate the heat exchanger unit. This is an ideal location in terms of its proximity to the engine compartment for optimal routing of the refrigerant and coolant lines and to the discharge air vents. The space on each side of the driver's seat 60 provides ample room for mounting a blower without restricting the driver's access.

The preferred embodiment of the invention offers the further advantage that the filter unit is located outside the cab in a space that normally serves no functional purpose, namely the space within the wheel fender. Furthermore, the installation of the HVAC system into the cab is simplified by using the B-pillar to convey the air from the roof mounted intake grille to the dirty box 70 of the filter unit 30.

The invention claimed is:

1. An off-highway agricultural vehicle, comprising a cab, comprising:
   a roof, including an intake opening formed along a portion of the roof;
   a floor;
   a plurality of spaced-apart pillars, wherein at least one pillar of the plurality of spaced-apart pillars is positioned between a forward end pillar of the plurality of pillars and a back end pillar of the plurality of pillars, the at least one pillar connects the roof to the floor and is configured to support the roof, and the at least one pillar configured to move air from the intake opening above the at least one pillar through the at last one pillar;
   a wheel fender arranged on an outside of the cab, the wheel fender defining a top surface configured to be spaced apart from an adjacent wheel of the off-highway agricultural vehicle;
   a seat for an operator supported within the cab; and
   a console unit arranged forward of the seat and configured to house an instrument display, wherein the cab is fitted with a heating, ventilation and air conditioning (HVAC) system including:
      a heat exchanger unit;
      a filter unit configured to receive the air via the intake and the at least one pillar and to direct the air to the heat exchanger unit, wherein the filter unit is positioned between the top surface of the wheel fender and the adjacent wheel of the off-highway agricultural vehicle;
      a blower configured to provide the air received from the filter unit to the heat exchanger unit; and
      a filter unit conduit disposed within the cab, wherein the filter unit conduit is configured to guide the air from the filter unit to the blower, and the filter unit conduit curves to follow a curved fore-aft contour of the wheel fender between the filter unit and the blower;
      wherein the heat exchanger unit is located within the console unit; and
      wherein the blower is located separate from the console unit on the floor of the cab beneath or next to the seat and is connected to the heat exchanger unit by way of a blower conduit, and a portion of the blower conduit is positioned to extend through at least a portion of the floor.

2. The off-highway agricultural vehicle as claimed in claim 1, wherein the filter unit has a clean box and a dirty box separated from one another by a filter element, and wherein the clean and dirty boxes of the filter unit are housed between the top surface of the wheel fender and the adjacent wheel of the off-highway agricultural vehicle.

3. The off-highway agricultural vehicle as claimed in claim 1, wherein the at least one pillar is positioned next to a door of the cab.

4. The off-highway agricultural vehicle as claimed in claim 2, comprising an access cover positioned adjacent to the top surface of the wheel fender, wherein the access cover is removable from the wheel fender to enable access to the filter element.

5. A cab of an off-highway agricultural vehicle, the cab extending between a forward end configured to be located aft of an engine bay of the off-highway agricultural vehicle and an aft end opposite the forward end, the cab comprising:
 a roof having an intake opening;
 a floor;
 a duct configured to receive air from the intake opening;
 a seat for an operator supported within the cab; and
 a console unit arranged forward of the seat at a location adjacent to the forward end of the cab and configured to house an instrument display, wherein the cab is fitted with a heating, ventilation and air conditioning (HVAC) system including:
  a heat exchanger unit located within the console unit so as to be positioned between the forward and aft ends of the cab;
  a first filter unit configured to receive the air directed to the heat exchanger unit, wherein the first filter unit is positioned between a top surface of a wheel fender positioned on the outside of the cab and an adjacent wheel of the off-highway agricultural vehicle, and the duct is configured to direct the air from the intake opening of the roof to the first filter unit;
  a blower configured to provide the air to the heat exchanger unit;
  a floor-level conduit extending between the blower and the heat exchanger, wherein the blower is located on the floor of the cab, separate from the console unit, beneath or adjacent the seat and is connected to the heat exchanger unit by way of the floor-level conduit, and the floor-level conduit extends through at least a portion of the floor;
  a filter unit conduit extending between the first filter unit and the blower, wherein the filter unit conduit is disposed within the cab, the filter unit conduit is configured to guide the air from the first filter unit to the blower, and the filter unit conduit extends along the wheel fender; and
  a second filter unit coupled to the filter unit conduit along the wheel fender between the first filter unit and the blower, wherein the second filter unit is configured to enable interior air from an interior of the cab to flow into the filter unit conduit toward the blower.

6. The cab as claimed in claim 5, wherein discharge vents are mounted in the console unit to direct the air passing through the heat exchanger unit toward the operator.

7. The cab as claimed in claim 5, wherein the first filter unit has a clean box and a dirty box separated from one another by a filter element, and wherein the clean and dirty boxes of the first filter unit are housed within the wheel fender.

8. The cab as claimed in claim 7, wherein the filter unit conduit is configured to guide the air from the clean box to the blower, and the filter unit conduit curves to follow a curved contour of the wheel fender.

9. The cab as claimed in claim 5, wherein the intake opening is positioned along an underside of the roof of the cab.

* * * * *